United States Patent [19]

Ulicki

[11] 4,028,733

[45] June 7, 1977

[54] PICTORIAL INFORMATION RETRIEVAL SYSTEM

[75] Inventor: Edward M. Ulicki, East Paterson, N.J.

[73] Assignee: Telebeam Corporation, Paramus, N.J.

[22] Filed: July 7, 1975

[21] Appl. No.: 593,680

[52] U.S. Cl. .............................. 360/10; 340/172.5; 325/308; 358/86; 358/142; 360/18; 360/19; 360/33; 360/72
[51] Int. Cl.² ................. H04N 5/785; G11B 15/40
[58] Field of Search ........................... 444/1; 445/1; 340/172.5; 178/6.6 DD, 6.6 FS, DIG. 13; 325/308; 360/10, 18, 19, 33, 35, 72; 358/86, 142

[56] References Cited

UNITED STATES PATENTS

| | | | |
|---|---|---|---|
| 3,599,178 | 8/1971 | Jackson et al. | 340/172.5 |
| 3,637,928 | 1/1972 | Poulett | 178/6.6 DD X |
| 3,740,463 | 6/1973 | Youngstrom et al. | 360/19 |
| 3,757,225 | 9/1973 | Ulicki | 325/308 |
| 3,767,901 | 10/1973 | Black et al. | 340/172.5 X |
| 3,774,158 | 11/1973 | Clark | 340/172.5 |
| 3,803,491 | 4/1974 | Osborn | 178/DIG. 13 |
| 3,809,302 | 5/1974 | Malyon | 360/72 X |
| 3,836,888 | 9/1974 | Boenke et al. | 340/172.5 |
| 3,878,560 | 4/1975 | Ramage | 360/10 |
| 3,882,538 | 5/1975 | Lowe | 360/9 |
| 3,890,639 | 6/1975 | O'Donnell et al. | 360/14 |
| 3,900,887 | 8/1975 | Soga et al. | 360/18 |
| 3,925,815 | 12/1975 | Lemelson | 360/14 |
| 3,931,457 | 1/1976 | Mes | 178/6.6 DD |
| 3,934,226 | 1/1976 | Stone et al. | 340/172.5 |
| 3,950,782 | 4/1976 | Carey et al. | 360/72 |
| 3,956,740 | 5/1976 | Jones et al. | 340/172.5 |
| 3,987,484 | 10/1976 | Bosch et al. | 360/33 |
| 3,988,778 | 10/1976 | Swenson | 360/72 |

Primary Examiner—Gareth D. Shaw
Assistant Examiner—Jan E. Rhoads
Attorney, Agent, or Firm—Hubbell, Cohen, Stiefel & Gross

[57] ABSTRACT

A system for retrievably providing a video display of a pictorial information message on a video display device from video information stored, such as on a video tape, in a plurality of frames, unique pictorial information being stored in each frame for display thereof in response to a request therefor, the frames each including a plurality of segments with one displayable pictorial information message being contained in each segment, the selected segment being retrievable for individual display of only this requested pictorial information containing frame segment. The video tape storage media in addition to the video track upon which the pictorial information is stored, contains an audio track having unique frame identification code information stored thereon for providing a frame location signal which is utilized to retrieve the frame. The frame segment is retrieved by preferably counting horizontal sync pulses to determine the proper location of the requested frame segment within the displayable frame video signal. A masking generator is utilized together with a gating network to mask out all portions of the displayable video frame signal other than the frame segment portion containing the requested pictorial information. The pictorial information may preferably be signatures associated with unique account numbers, such as bank accounts, to enable verification of an externally provided signature for the associated account number and, in conjunction with associated data processing means, a selected transaction associated with this account may occur substantially simultaneously with the video display of the signature for verification.

35 Claims, 6 Drawing Figures

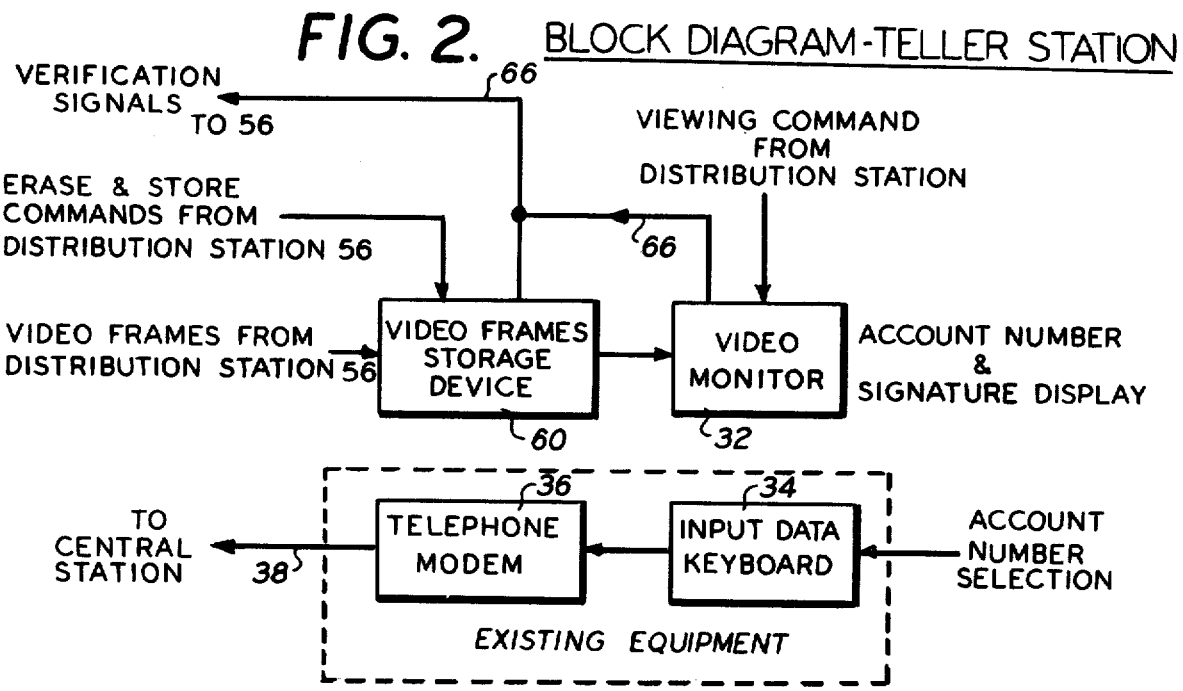
FIG. 2. BLOCK DIAGRAM-TELLER STATION
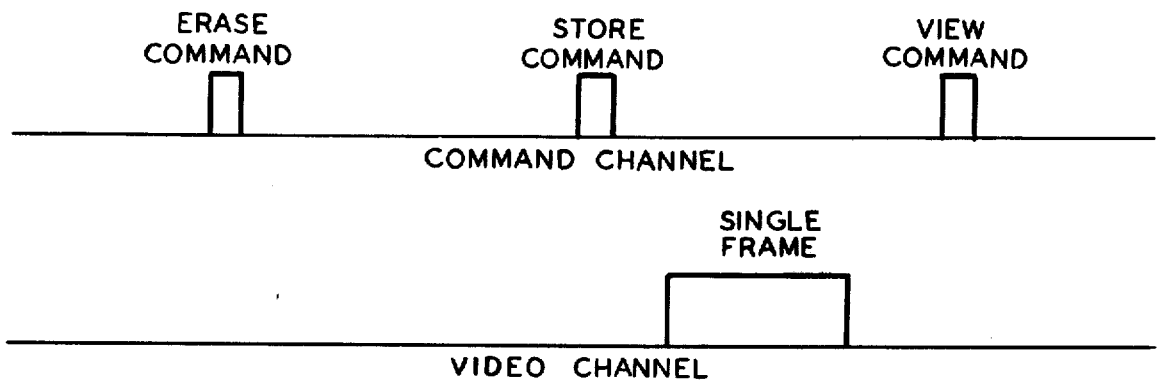
FIG. 5. TIMING DIAGRAM
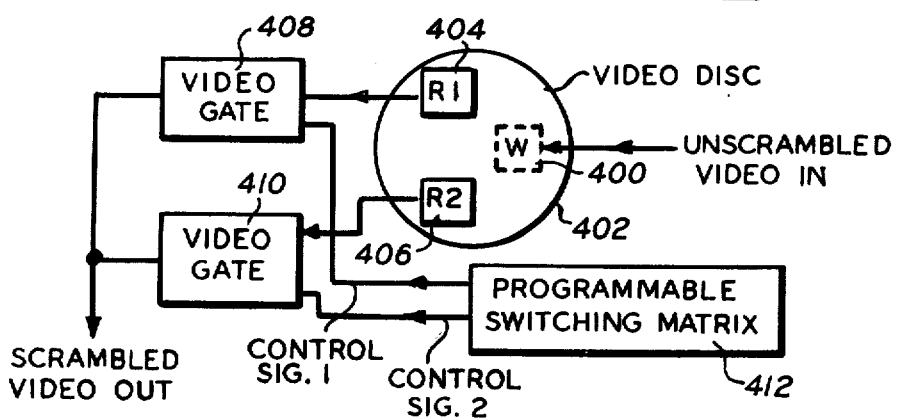
FIG. 10. TRANSMITTER

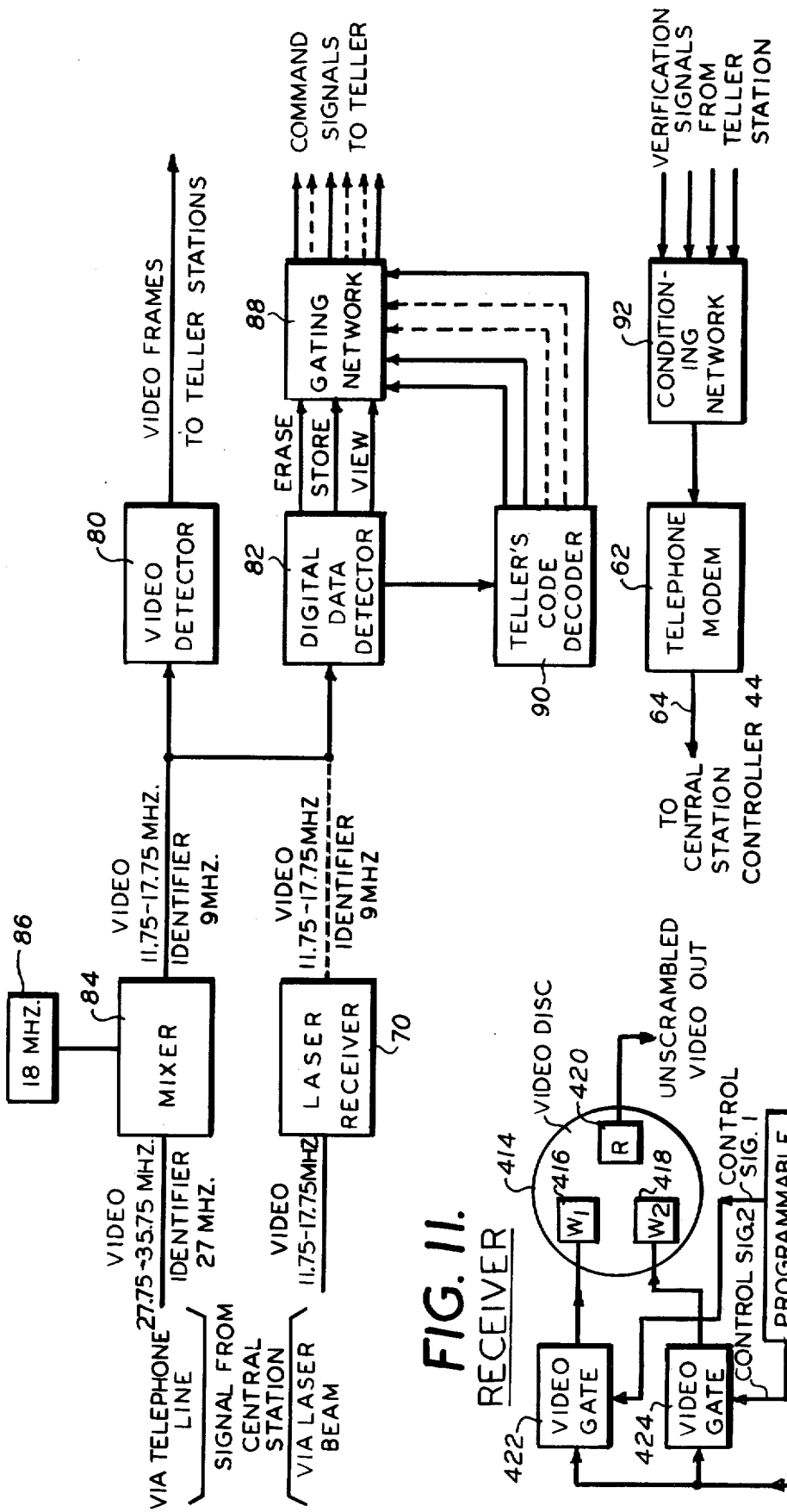
FIG. 3.
BLOCK DIAGRAM – DISTRIBUTION STATION
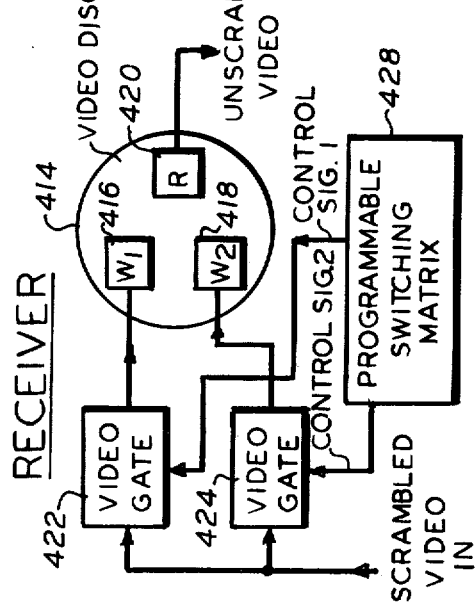
FIG. 11. RECEIVER

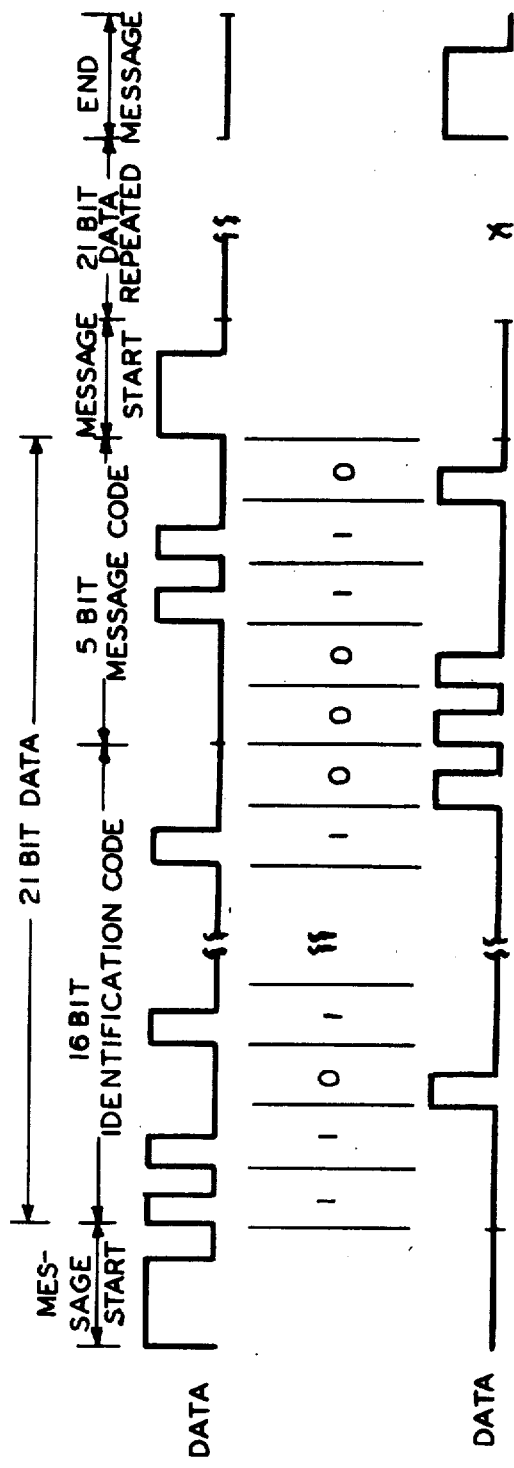
FIG. 4. DIGITAL MESSAGE FORMAT
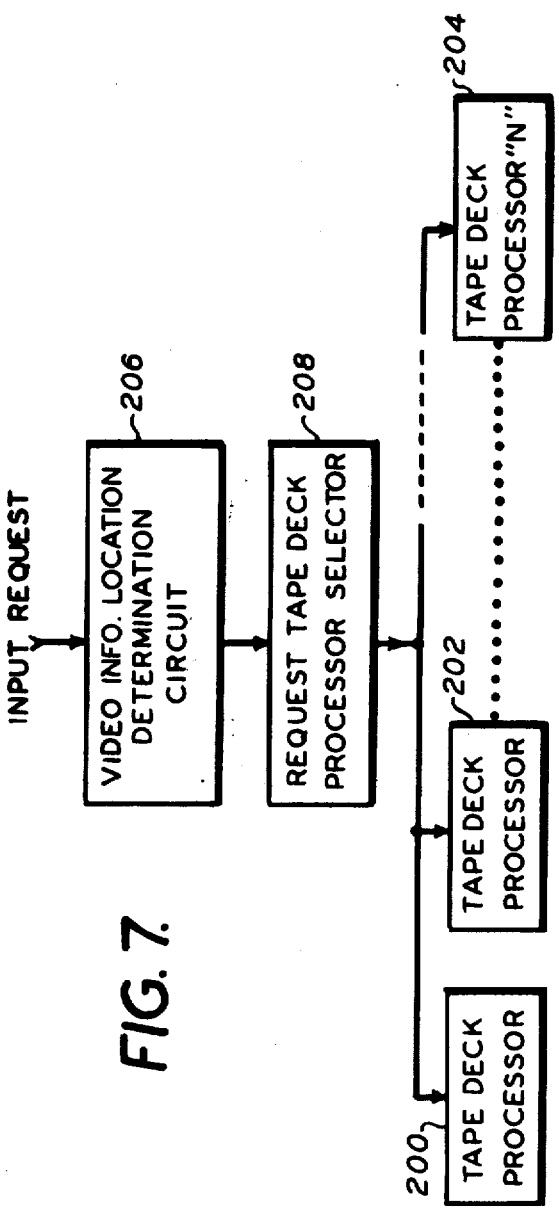
FIG. 7.

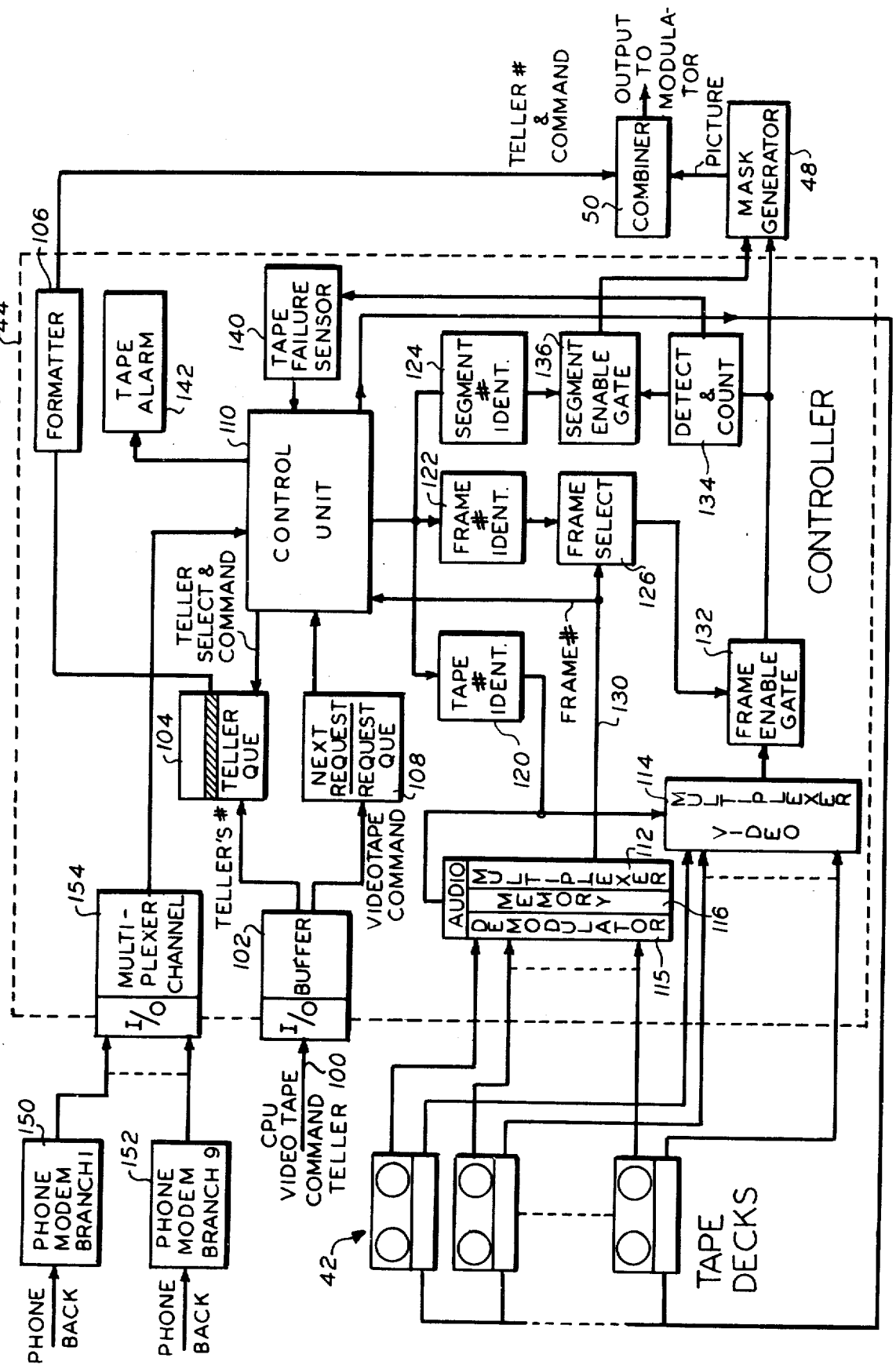
FIG. 6. DATA RETRIEVAL SYSTEM

PICTORIAL INFORMATION RETRIEVAL SYSTEM

FIELD OF THE INVENTION

The present invention relates to systems for pictorial information retrieval.

DESCRIPTION OF THE PRIOR ART

Prior art systems for retrieval of pictorial information in which a video display of the retrieved pictorial information, such as for verification of the pictorial information with exernally provided information, such as signatures associated with bank accounts, have not proved satisfactory for several reasons, such as cost and inefficiency. One prior art system, by way of example, for providing retrieval of pictorial information, is the Ampex video file information system in which a hard copy print out of retrievable information on video tape, such as documents, is provided. This system, however, does not provide a video display of the pictorial information, such as a signature, for purposes of verification but rather provides a conventional hard copy print out of information stored on video tape. Other such prior art systems for retrieval of video information, such as that disclosed in U.S. Pat. No. 2,721,990 are complex and costly in that information is transferred from a video storage tape to or from a drum and is stored on the tape in the form of message codes with the drum information having to be converted and read out to a cathode ray tube for video display of the characters represented by the code converted message code signals. This system does not lend itself towards retrieval of pictorial information of the type in which display thereof is desired for verification with externally provided pictorial information, such as signatures, as the coding to insure fidelity of the reproduced signal would be quite complex. Other prior art systems for the retrieval of video information, by way of example, are disclosed in U.S. Pat. Nos. 2,947,978 and 3,051,777. However, these prior art systems, as well as the balance of prior art systems presently known to the Inventor, are low density systems in which one piece of information is stored per frame and, accordingly, because of this low density, require unsatisfactory access time to retrieve this video information. Furthermore, these prior art systems conventionally retrieve this video information from a plurality of video tapes in sequential fashion rather than based on optimum access time for a requested pictorial information message in a random sequence of pictorial information message requests. These disadvantages of the prior art are overcome by the present invention.

SUMMARY OF THE INVENTION

A pictorial information retrieval system for retrievably providing a video display of an information message on a video display means includes a video tape storage media having a plurality of these video displayable messages storable thereon with the storage media having a first audio track having identification information thereon and a video track having video information thereon. The video information comprises a plurality of video displayable frames, each of these frames being capable of providing a video signal containing the video displayable information within the frame. Preferably, each frame comprises a plurality of frame segments with each of the frame segments containing one of the video displayable messages, such as a signature which may be displayed for verification thereof, and is capable of providing a portion of the frame video signal. The first audio track identification information preferably comprises a plurality of different unique frame identification codes, each frame code being uniquely associated with one frame of the plurality of frames. Each of the frame video signals further comprises a plurality of horizontal sync pulses for the video display of the frame video signal with each of these sync pulses being associated with a displayable video scan line. Each of the frame segment video signal portions of the frame video signal comprises a predetermined portion of the plurality of displayable video scan lines associated with the frame video display having a corresponding predetermined portion of the plurality of horizontal sync pulses. Means, such as including a keyboard input means or touch-tone telephone input are provided for selecting a unique video displayable message, the selection means providing a unique selection control signal which uniquely corresponds to this selected message. Means for scanning the storage media, such as including conventional video playback heads capable of reading the video track and the audio track of the tape are provided for scanning the video tape in response to the selection control signal, the scanning means including means, such as the heads, for providing a video display from the video tape and means responsive to the first audio track information for providing a frame location signal. Condition responsive means, such as including a gating network for the frame selection and frame segment associated with the selected message are operatively connected to the scanning heads for retrieving the frame containing the selection message in response to detection of the frame location signal associated with the selected message containing frame, as well as for counting the horizontal sync pulses in the retrieved frame for providing a display control signal for retrieving the frame segment containing the selected message in response to detection of the count associated with the selected message containing segment. A mask generator is connected to the output of the condition responsive gating network for providing a composite video displayable output signal to the video display means with the mask generator providing the selected message as the output signal in response to receipt of the display control signal and blanking the entire frame in the absence of receipt of the display control signal, the mask generator normally blanking the video frame in the absence of receipt of the proper frame and frame segment information, whereby a single frame segment may be selectively retrieved from a plurality of frames for video display thereof. The pictorial information retrieval system may be operatively connected to a data processing means, such as a general purpose digital computer, for substantially simultaneous processing of a selected transaction associated with the pictorial information being retrieved and displayed, such as, by way of example, if the pictorial information is a signature associated with a bank account, then a bank account transaction, such as withdrawal of money, may be processed simultaneously with the video display of the signature associated with the account in response to the provision of this input information to the system including the data processor. Preferably, the data processor includes condition responsive means for providing the unique selection control signal in response to the provision of the selected unique identification code for the pictorial information. Thus, if desired, if the system is utilized for a bank account, and the account has been closed, a standard message, such as "account closed," can be the pictorial information display instead of the associated signature if this account is requested for retrieval by the system.

For increased capacity and decreased access time, the system preferably includes a plurality of similar format video signal storage media, such as video tapes, each having a plurality of the video displayable messages storable thereon and having a first audio track having identification information thereon and video track having video information thereon which comprises a plurality of video displayable frames such as the type previously described in which the frame comprises a plurality of frame segments, with each frame segment containing one pictorial information message. In this instance, a plurality of scanning heads is provided for scanning each of the storage media with each of the storage media preferably having an associated position and velocity with respect to the scanning means. Preferably, each of the video tapes has associated different scanning velocities, such as conventional play speed, high speed, known conventionally as fast forward, and a rewind speed which is associated with movement of the tape in the opposite direction. The message selection means, may include a plurality of time sharing input devices, such as touch-tone telephone devices in which a plurality of unique video displayable messages may be selected in a random sequence and provided to the system. The system includes condition responsive means for sensing the position and velocity of each of the video tape storage media being scanned in order to provide a unique optimum selection control signal uniquely corresponding to the selected message in accordance with the earliest scannable selected message in the random sequence dependent on the various positions and velocities associated with the plurality of video tape storage media being scanned. The scanning means comprising the scanning heads provides the video display of the earliest scannable selected message to the condition responsive gating network in response to the unique optimum selection control signal with the gating network retrieving the frame containing the earliest scannable message in response to detection of the frame location signal associated with this earliest scannable selected message containing frame.

The video output of the system may preferably be provided to an intermediate transmission buffer storage, such as a frame grabber preferably connected to the output of the mask generator for grabbing the video frame segment earliest scannable selected video output signal to provide a continuous repetitive video output transmission thereof. The frame grabber has an associated information recording rate for storage of the video output signal and an associated information playback rate for transmission of the video output signal which rates may preferably differ so that recording of this information may be at high speed while provision of this information to the output lines, such as to voice grade television lines, may be at a requisite low speed, the frame grabber providing a high speed/low speed information buffer. In addition, if desired, a secure transmission for the video output signal may be provided by operatively connecting a scrambling network to the output of the frame grabber, such as a plurality of read heads which are selectively switched through a gating network in accordance with a predetermined scrambling function, each of the read heads, by way of example, scanning a portion of the plurality of scan lines comprising the video displayable selected message. In such as instance, the receiver is provided with an appropriate unscrambling network which also utilizes an intermediate frame grabber buffer storage upon which the incoming scrambled signal is recorded by selectively switching a plurality of write heads in accordance with the appropriate unscrambling function.

The condition responsive means which senses the position and velocity of each of the video tape storage media being scanned and provides a unique optimum selection control signal uniquely corresponding to the selected message in accordance with the earliest scannable selected message in the randomly selected sequence preferably includes means for varying the speed of scanning of each of the video tapes in accordance with the unique optimum selection control signal dependent on the position and velocity of the frames containing the selected messages with respect to the scanning means so as to provide the earliest scannable selected message, this speed varying means also including means for varying the direction of each of the video tape storage media in accordance with the unique optimum selection control signal so as to provide the earliest scannable selected message, this speed varying means preferably comprising a conventionally programmable minicomputer together with associated sensing circuitry for detecting the various tape positions and tape velocities and for constantly updating the unique optimum selection control signal so as to continually correct the earliest scannable selected message as additional messages are provided to the system.

BRIEF DESCRIPTION OF THE DRAWINGS

FIG. 2 is a block diagram of an individual information display and request station in accordance with an example of the system of FIG. 1;

FIG. 3 is a block diagram of an information distribution portion of the system illustrated in FIG. 1;

FIG. 4 is a graphical illustration of a typical digital message format for a message utilized in the system of FIG. 1;

FIG. 5 is a graphical illustration of a typical timing diagram for the messages utilized in the system of FIG. 1;

FIG. 6 is a block diagram of the preferred data retrieval network portion of the system of FIG. 1;

FIG. 7 is a block diagram of the preferred controller portion of the system of FIG. 1;

FIG. 10 is a block diagram of the transmitter portion of a preferred secure transmission system for use in the system of FIG. 1; and FIG. 11 is a block diagram of the preferred receiver portion of the secure transmission system illustrated in FIG. 10.

DETAILED DESCRIPTION OF THE PREFERRED EMBODIMENT

Figure 1:
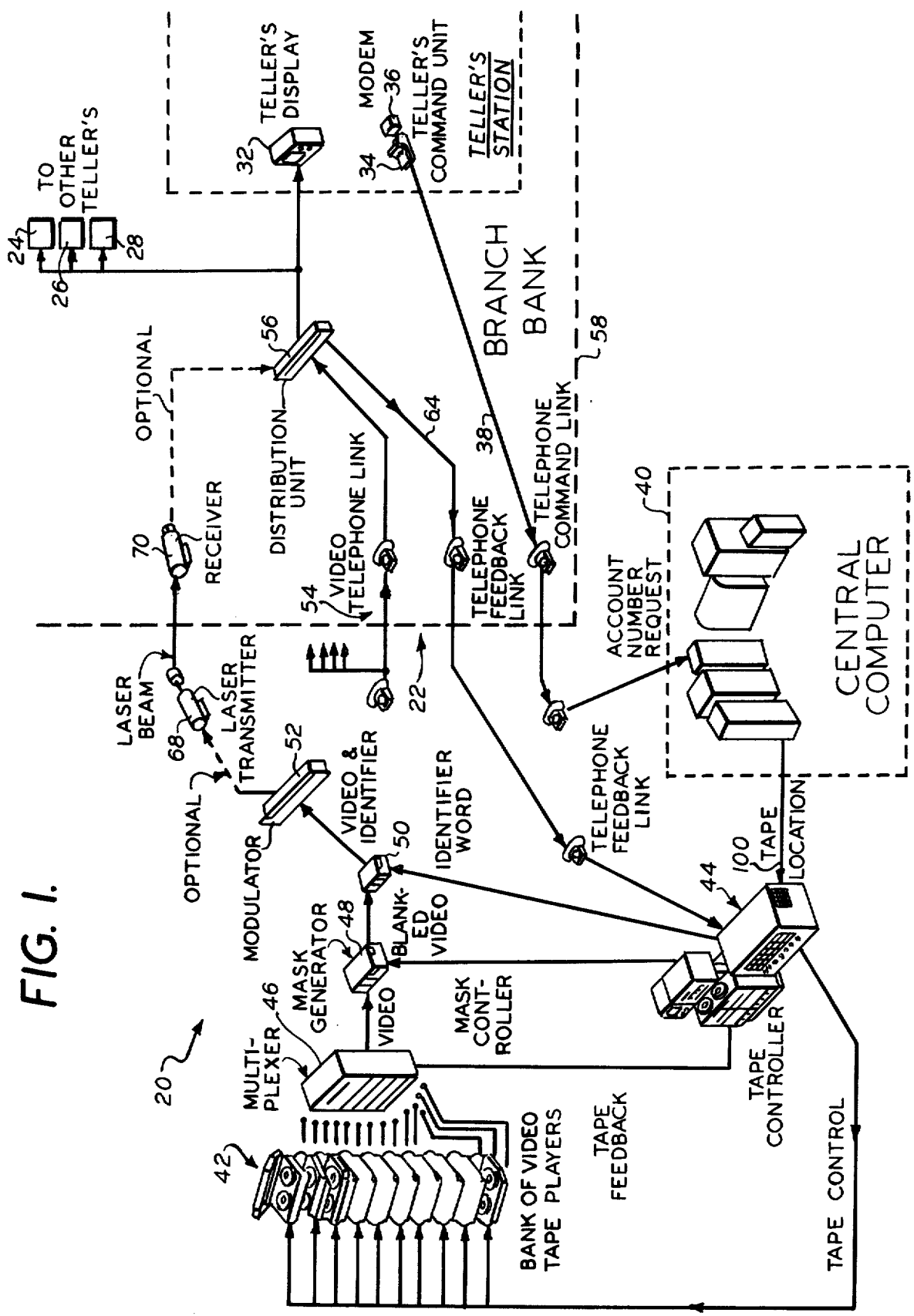
FIG. 1 is a block diagram of the preferred pictorial retrieval system in accordance with the present invention.

Referring now to the drawings in detail, and initially to FIG. 1, a block diagram of a pictorial retrieval system generally referred to by the reference numeral 20 in accordance with the present invention is shown. For purposes of explanation, the pictorial retrieval system 20 of the present invention shall be described as a system for retrieving signatures for video display thereof which are associated with corresponding accounts such as bank accounts. Of course, if desired, the pictorial retrieval system 20 of the present invention could be utilized for retrieving any type of pictorial information such as for credit verification or, by way of example, for security verification such as by displaying a photograph of an individual for purposes of verification of the individual's identity. In any event, the pictorial retrieval system 20 of the present invention could be utilized for verification of the retrieved pictorial information with externally provided pictorial information, such as a signature on a withdrawal slip for a bank account. The pictorial retrieval system 20 of the present invention, as illustrated in FIG. 1, preferably enables computerized retrieval of data and pictures which is distributable to remote locations for video display thereof. As will be described in greater detail hereinafter, a real-time telephone interactive system 22 is preferably utilized for enabling selection of the pictorial information, or signatures, to be displayed at the various remote locations, four such remote locations, 24, 26, 28 and 30 being shown by way of example and FIG. 1, remote location 30 illustrated in greater detail being a typical remote location. In the example being given, the system 20 is utilized for retrieval of pictorial information by bank tellers, each of these remote locations 24 through 30 being an individual bank teller's station and including a conventional video display monitor 32 for providing the pictorial display at the remote teller station and a conventional keyboard selection device 34, such as an IBM 1060 command unit, conventionally connected to a conventional modem 36 for providing the selection information associated with the video display desired via a conventional telephone command link 38 which is part of the real time telephone interactive telephone system 22, to a conventional central general purpose digital computer 40, such as an IBM 370 model 145, for processing of this information in the manner to be described in greater detail hereinafter. In the example being given, this selection information from keyboard 34 preferably comprises the account number request associated with the pictorial information to be displayed on the display device 32, by way of example. As will be described in greater detail hereinafter, preferably at the same time that a transaction associated with the account, such as a withdrawal for a bank account, is being processed in conventional fashion by the central computer 40, the computer 40 will preferably retrieve linkage information which will enable retrieval of the pictorial information or signature associated with the requested account from a video storage media, such as a video tape file 42 illustrated by way of example in FIG. 1, the video tape file 42 preferably comprising a bank, or plurality, of conventional video tape players, the linkage information being utilized by a tape controller 44 to be described in greater detail hereinafter, to control the selection of the appropriate video tape portion for providing the video display of the requested pictorial information from the video tape file 42. As shown and preferred in FIG. 1, the teller's video display unit 32 and keyboard request unit 34 are coupled to the central computer 40 and to the balance of the pictorial retrieval system 20 by means of conventional voice grade telephone lines. As will be described in greater detail hereinafter, when a user, in this instance a teller, provides an account number request to the pictorial retrieval system 20 via keyboard input device 34, as well as an identification code for the transaction to occur and the appropriate information associated with the transaction, such as a withdrawal, central computer 40 will receive this information, and utilizing a conventional look-up table, will retrieve the location information of the signature associated with that account in the video tape file 42 and provide this video tape location information to the video tape controller 44. Thereafter, as will be described in greater detail hereinafter, preferably simultaneously with the processing of the account transaction by the central computer 40, the video tape controller 44 will search the video tape file 42, locate the proper signature and, through a conventional multiplexer 46, mask generator 48, signal combinor 50, modulator 52, voice grade telephone link 54, and the distribution unit 56, all of which will be described in greater detail hereinafter, provide this pictorial information to the appropriate teller's video display terminal 32.

In the example being given, it is assumed that the pictorial retrieval system 20 is utilized in a bank system wherein the bank has a plurality of branches, with each bank branch having a plurality of teller stations, such as teller stations 24 through 30, one such typical branch bank 58 being shown by way of example in FIG. 1. The distribution equipment 56 located in each branch office of the bank 58, is preferably a conventional routing network, which receives both video picture information and video command information, as will be described in greater detail hereinafter. The video picture information received is preferably composite video signal which has been formatted for display on a conventional video display monitor, such as an ordinary television monitor. The video display, as will be described in greater detail hereinafter preferably comprises a video frame which has been formatted by the tape controller 44 in conjunction with the mask generator 48 to provide the requested pictorial information or signature centered in the video frame being displayed, this frame preferably being repetitively continuously displayed from a conventional frame grabber 60 (such as a Hitachi frame grabbing disc) associated with the video display monitor 32. A distribution unit 56, as was previously mentioned, also receives video command information which is preferably a video identification signal with a command code which indicates which remote teller unit 24 through 32, by way of example, is being addressed and provides control signals to this addressed display unit 32 to take certain actions, these control signals consisting of erase commands to clear the video frame storage or frame grabbing device 60 associated with the video monitor 32, storage commands to the video frame storage device 60 to initiate the storage of a new frame for display on the video display monitor 32 and view commands to actually display the signals contained in the video frame storage device 60 on the video display monitor 32. Conventional electronic hand-shaking signals are exchanged between the distribution unit 56 and the appropriate teller's display unit 32 being addressed, the distribution unit 56 also providing feedback to the video tape controller 44 through a conventional modam 62 and the voice grade telephone line 64. This feedback information informs the video tape controller 44 that the video frame storage device 60 associated with the appropriate video monitor 32 has performed as was commanded and operation is satisfactory, this verification signal being provided via path 66 from the video frame storage device and video monitor 32 to the distribution unit 56 and therefrom, via modem 62 and voice grade telephone line 64, to the video tape controller 44. If desired, this feedback path provided through the distribution unit 56 may be utilized for automatic check-out and testing of each of the remote teller display units 24 through 30, by way of example, from a central station.

As shown and preferred in FIG. 1, the distribution unit 56 may preferably receive input video and command signals in any conventional fashion, such as from the voice grade video telephone lines previously described, from coaxial cable, or from conventional laser transmission utilizing a conventional laser transmitter 68 and a conventional laser receiver 70.

As was previously mentioned, and as will be described in greater detail hereinafter, the central computer 40 receives request from various branches and teller's keyboard input device 34 via conventional telephone modems 36, each request having a customer's account number, the type of transaction, for example deposit or withdrawal, and the amount of money involved. The signal also preferably contains a bank branch identification code, the pictorial retrieval system 20 utilizing the teller identification code, the bank branch identification code and the account number for retrieving the selected pictorial information and routing it to the proper teller display unit 32. Within the central computer 40, the selected account number is transformed into a pointer in conventional fashion through conventional programming, this pointer indicating the location on tape of the particular signature associated with the selected account number, this pointer being selected in conventional fashion, as previously mentioned, utilizing a table look-up. This central computer 40 then preferably provides this tape location command signal to the video tape controller 44 as well as providing an identification word signal to the tape controller 44 which identifies the teller requesting the information and the bank branch where this teller display is located, this information being provided from the input teller identification and bank branch identification codes. The central computer 40 and the video tape controller 44 are preferably operatively connected to each other via a conventional input/output channel of the central computer 40.

The tape controller 44, which will be described in greater detail hereinafter with reference to FIGS. 6, 7, 8 and 9, preferably utilizes the tape location information signal provided by the central computer 40 to identify the particular video tape recorder which contains the pictorial information or signature associated with the requested account number, from the video tape file or bank of video tape recorders 42. By way of example, if 10 video tape recorders are utilized to store the pictorial information or signatures and 500,000 signatures, by way of example, is the selected storage capacity for the system 20, each tape in the video tape file 42 will preferably contain the same amount of signatures so that approximately 50,000 signatures will be stored per tape recorder. In addition, as will be described in greater detail hereinafter, preferably each video frame on the video tape associated with a particular video tape recorder utilized in the system 20 will contain a plurality of frame segments with one unique signature being retrievably stored in each frame segment of each video frame. Thus, by way of example, if ten signatures are stored in each video frame which is, accordingly, divided into ten frame segments, the 50,000 signatures for the video tape previously described by way of example, would only require 5,000 video frames for storage of this information, these 5,000 frames representing approximately three minutes of conventional video tape at a conventional playback rate. Preferably, the information stored in the 5,000 frames is repeated for several identical groups of these 5,000 frames along the length of the video tape so that the 5,000 frame content is repetitively stored thereon for minimizing the effects of tape wear and providing a rapid means of accessing particular frames of the tapes, these 5,000 frame groups being adjacent to each other along the length of the video tape. As will be described in greater detail hereinafter, this video frame information is preferably stored in the video track of the video tape which also preferably has a pair of audio tracks, one audio track containing one pulse per frame so that the tape may be rapidly searched as will be described in greater detail hereinafter and the other audio track preferably containing a plurality of unique identification codes, preferably in a digital format, with one such identification code corresponding to a particular unique frame on the tape. This unique identification code is preferably related to the tape location command information received from the central computer 40. As will also be described in greater detail hereinafter, the tape controller 44 provides tape control signals which enable variations in the scanning rate of the various video tapes in the video file 42 being scanned, the various tapes being switchable between a conventional fast forward scanning rate, a conventional rewind rate and direction, and a conventional playback scanning rate or mode so as to enable searching, acquisition and playing of the particular selected frame. Preferably, in the search mode for the video tape file 42 of the pictorial retrieval system 20, the various video tape recorders identify the tape frames from the digital coding contained on the audio track having this information, the main computer 40 acting as a digital servo control system to slue the tape unit to the particular frame and slow it down by means of the tape control signals provided from the tape controller 44 so that the frame containing the pictorial information or signature associated with the requested account number can be viewed at conventional playing speeds. By way of example, in the slue mode, the various tape recorders are preferably able to travel at a scanning rate of 60 to 100 times greater than that for the normal play mode so that, assuming in the example given that the entire 5,000 frames of unique information for the tape comprises 180 seconds, these 180 seconds can be slued through in approximately 1.82 seconds which, adding in conventional start-up and slow-down times for the video tape unit can, in the example given, provide an overall access time for a particular frame or between 4 and 6 seconds.

As was previously mentioned, the outputs of the various video tape units associated with the video tape file 42 are combined in a conventional multiplexer 46, which selects the particular tape which is allowed to be transmitted at a given time, the operation of this multiplexer 46 preferably being controlled by the video tape controller 44. In addition, if the system preferanly contains a plurality of signatures packed into each video frame, such as in the plurality of frame segments previously mentioned, in order to provide a video display at the teller station of only the signature associated with the requested account, the mask generator 48 functions to accomplish this by providing banking signals for those scan lines of video which are not part of the signatures associated with the account being requested. The operation of masking generator 48, which is a conventional masking generator, is preferably monitored and controlled by tape controller 44 to provide a resulting composite video signal having the retrieved signature centered in the video frame output signal with the undesired signatures masked out. As was previously mentioned, the tape controller 44 also provides the identifier words for transmission of the retrieved pictorial information or signature to the appropriate teller's display unit 32, this identifier word merely being a reformatting of the branch number and teller number information received from the central computer 40, the reformatting adding on a command word in addition to this information which enables the tape controller 44 to operate the distribution unit 56 at the appropriate branch bank 58 to enable identification of a particular teller station to receive a new frame, to erase the previous frame displayed at the teller's station, to store a particular frame into the tellers memory unit 60 and to enable viewing of the frame stored in the teller's memory unit 60. In addition, if desired, a command word may enable the distribution unit 56 to provide test signals for the system 20. This identifier word and the partially blanked video signal 48 are preferably combined in the conventional combining unit 50, and presented for transmission to the conventional modulator 52. When a laser tranmission system is utilized for transmission of this information to the branch bank 58, the combinor output signal is preferably utilized to modulate the laser beam in conventional fashion, the receiver 70 of the branch bank 58 conventionally demodulating the signal. When conventional voice grade telephone line transmission is utilized for transmission of this information to the branch bank 58, the signal is transmitted as composite video with no special modulation being required except to transmit the identifier signal, preferably, on a separate command channel In the instance when a coaxial cable is utilized to distribute this combinor output signal, the modulator 52 preferably up converts the signal and modulates an RF carrier to transmit the signal over the coaxial cable system, the up converted frequency being dependent upon the particular cable system chosen.

Referring once again to FIG. 2, which illustrates a typical teller station 30 utilized in the pictorial retrieval system 20 of the present invention, in addition to the video frame information signal provided from the distribution station 56, which video frame signal, as previously described, contains the retrieved pictorial information or signature associated with the requested account preferably centered in the frame, three types of command signals are sent to each teller's station in the appropriate branch bank 58 from the distribution station 56, these signals being the erase, store and viewing commands previously discussed. The erase and store commands are principally for the video frame storage device 60 so as to enable its operation to be remotely controlled. The timing relationship between the erase and storage commands is graphically illustrated by way of example in FIG. 5, and is preferably chosen so as to provide sufficient time for the video frame storage device 60 to completely erase its memory prior to the reception of new information. In order to accomplish this, the central computer 50 preferably initiates an erase command to the specific teller's station 30 as soon as the computer 40 receives a request for signature verification in the form of a requested account number. The computer 40 is preferably programmed in conventional fashion to insure that a sufficiently long time period elapses between the provision of this erase command and the provision of the store command to the specific teller's station for storage of a particular selected video frame. When a store command is received by the video frame storage device 60, it preferably, in conventional fashion, then looks for the next vertical sync input on the video line and proceeds to store the next video frame for an indefinite period of time before receiving an erase command. Preferably, this stored frame will not be immediately displayed in the associated video display monitor 32 since this store command also preferably represents a blanking commond for video monitor 32. The purpose of this blanking command is preferably to enable the computer 40 to verify that the correct frame was selected and sent to the proper specific teller, this being accomplished by receipt of the verification signals via path 66 which are transmitted by the distribution unit 56 through the voice grade telephone line feedback path 64 to the tape controller 44. This verification time is preferably required due to the account number being actually stored on the video tape and, accordingly, read off the tape at a time subsequent to the occurrence of the first vertical sync signal which initiates the storage of the frame. When this verification is completed, in conventional fashion, by the computer 40, it preferably transmits a viewing command signal through the distribution station 56 to the specific video monitor 32 of the specific teller station, which removes the blanking signal and, thus, enables a display of the stored video frame from the video frame storage device 60. By way of example, for a conventionally available video frame storage device, the store command must preferably precede the first vertical sync pulse of the video frame to be stored by at least 20 microseconds and, in addition, the erase command should precede the storage command by at least 5 frame time intervals, or approximately 200 milliseconds, the main or central computer 40 accurately controlling by means of a conventional internal real-time clock the timing relationships between all of the command signals as well as the tranmission of the specific video frames to the specific teller's station. Preferably, if desired, the verification signals provided from the video frame storage device 60 and video monitor 32 may be utilized as fault detection signals so that the distribution station 56 can inform the central station or central computer 40 if the proper commands were executed so that, if the commands have not been properly executed, the computer 40 can preferably automatically repeat the sending of the commands as well as retrieval and sending of the proper video frame and/or provide failure code information, if desired.

Referring now to FIG. 3, a typical distribution station 56 is shown by way of example. The function of the distribution station or unit 56 is to preferably properly receive, detect and decode the signals provided from the central station comprising the central computer 40, tape controller 44, video tape file 42, multiplexer 46, mask generator 48, combining unit 50, and modulator 52, and distribute these signals to each of the tellers at the particular branch bank 58, with the appropriate signal being distributed to the appropriate teller. As is shown in FIG. 3, reception of the signals from the central station, such as from modulator 52, may be accomplished either via voice grade telephone line transmission via path 54 or via laser transmission such as from laser transmitter 68 through laser receiver 70. These two transmission paths preferably require the employment of different frequencies for transmission. Accordingly, the frequencies are chosen so as to preferably keep the frequencies for the laser receiver as low as possible. By way of example, the center frequency of the identifier command channel is 27 megahertz for the voice grade telephone line whereas the appropriate center frequency for laser transmission is, by way of example, 9 megahertz. Thus, preferably in order to provide system flexibility for receipt of either laser transmission or voice grade telephone line transmission, so as in order to utilize the same conventional video detector 80 and digital data detector 82 in the distribution unit 56, a conventional mixer 84 having, by way of example, an 18 megahertz local oscillator 86 associated therewith is utilized to translate the video and identifier signals to the same frequencies for both laser transmission and voice grade telephone line transmission so that the distribution unit 56 can handle either telephone or laser transmission from the central station, the output of the mixer 84 preferably being, by way of example, an 11.75 to 17.75 megahertz RF video signal with an identifier signal having a 9 megahertz center frequency, which is preferably identical with the output of the conventional laser receiver 70. The video detector 80 preferably conventionally converts this RF signal directly to video base band suitable for the video frame storage device 60 and video display monitor 32 located at each of the teller's stations 24 through 30. Of course, if the system is to be utilized solely for laser transmission, then the mixer 84 and the local oscillator 86 may be omitted and, similarly, if the system is to be utilized solely for voice grade telephone line tranmission, laser receiver and transmitter 68 and 70, respectively, may be omitted and the video detector 80 and digital data detector 82 may be chosen to operate at the identifier command channel center frequency and RF signal range comparable to the voice grade telephone line transmission, such as an RF signal of 29.75 to 35.75 megahertz with an identifier command channel center frequency of 27 megahertz. The digital data detector 82 preferably decodes the digital message received from the central station by determining the code of the specific teller to whom the message is being sent, in conventional fashion, and the specific message command, whether it is an erase, store or viewing command. These commands, whether they be erase, stored or viewing commands, are provided from the digital data detector 82 to a conventional gating network 88 to provide one input to a conventional and gate arrangement. The teller's idenfication code is provided from the digital detector 82 to a conventional decoder network 90 which decodes this information to provide an enable signal to the gating network 88 to gate the transmitted erase, store or viewing command for signal to the teller display unit 32 corresponding to the teller identification code decoded by decoder 90 so that when the code of a specific teller is received with an accompanying command signal, such as an erase command, that command is transmitted only to that particular teller and to no other. It should be noted that the feedback signals from the distribution unit 56 are preferably the verification signals provided to a conventional conditioning network 92 before being provided to the modem 62 for conventionally conditioning these signals.

Referring now to FIG. 4, the identifier and command signals utilized in the pictorial retrieval system 20 of the present invention are preferably in a digital message format of the type illustrated by way of example in FIG. 4. Preferably, as shown in FIG. 4, the preferred digital message format has a capacity for a predetermined length identifier message, such as 16 bits by way of example which can represent 10,000 unique teller codes and binary coded decimal form, a predetermined quantity of bits for a message code, such as 5 bits by way of example which provides a capability for 32 unique command signals and, as shown and preferred in FIG. 4, the repeat of the complete data message comprising in the identification code and the message code in order to provide redundancy and, accordingly, a high level of assurance that no false commands will be received as a result of extraneous noise. As is also shown and preferred, the digital message format includes a message start pulse and an end message signal, an arbitrary code being illustrated in FIG. 4, by way of example. The digital data detector 82 of the distribution network 56 detects the two sets of digital data messages comprising, by way of example 21 bits each, compares them to provide a high level of assurance that they are in fact the data sent out by the central station and, only if both data bits streams are identical, enables the provision of the command signals contained in the message code portion of the digital message to the specific teller. As shown and preferred, the specific signal wave-form employed for both the digital 1 and 0 data streams is the near optimum raised cosine waveform in which nearly all the energy is contained in a narrow frequency spectrum thus enabling the use of narrow frequency filters and, accordingly, a high level of immunity to extraneous noise sources. Each of the signals illustrated by way of example in FIG. 4, represents a typical command signal, having an identification code portion and a command message portion. FIG. 5 illustrates a typical timing diagram of both the video and the identifier signals as transmitted from the central station to the distribution station for a particular teller. As shown and preferred in FIG. 5, the first message transmitted in sequence is an erase signal, the second signal transmitted is sequence is a store command followed by the video frame and the viewing command, the transmission of the single video frame being, in time, between the provision of the store command and the provision of the view command as illustrated in FIG. 5. The central computer 40 preferably performs this sequential operation, such as illustrated in FIG. 5, for each of the tellers in order to insure proper reception of all of the transmitted command and video signals.

Referring now to FIGS. 6, 7, 8 and 9, the retrieval of pictorial information by the central station portion of the pictorial information retrieval system 20 shall be described in greater detail. Referring initially to FIG. 6, a block diagram of the central station data retrieval portion is illustrated. Data retrieval is preferably a two step process at the central station, the first step converting the requested account number identification supplied by the teller keyboard input device 34 into a video frame number and segment number for the preferred system where the stored frames comprise a plurality of frame segments each having a unique pictorial information or signature stored therein.

The interface with the central computer 40 for conversion of this requested account number to a video tape location signal shall be described in greater detail hereinafter subsequent to the discussion of the tape controller 44 utilization of this tape location information and subsequent processing of the video picture, including masking of the unwanted signatures from the selected frame and the multiplexing of the video tape unit 42. As shown and preferred in FIG. 6, the data retrieval system portion of the central station is activated when the central processing unit or central computer 40 provides a video tape address and the teller's number via path 100, corresponding to the requested account number, to the tape controller 44. This signal passes through a conventional input/output buffer 102 which separates the video tape command from the teller's number of identification code. The teller's number is preferably stored in conventional storage means 104 in a que for retrieval when a command or picture is to be transmitted. Upon such retrieval, the teller's identification number is formatted in a conventional formatter 106 such as a serial shift register, for transmission over a communications link and fed to the conventional combiner 50, such as a differential video amplifier which combines the teller identification number with the video picture being provided from the mask generator 48 to the combiner 50. The video tape command, however requires additional processing. This video tape command preferably consists of the video tape number associated with the particular tape in the plurality of tapes contained in the video file 42, the frame number associated with the appropriate frame on this tape, and the segment of this frame in which the pictorial information associated with the requested account is located. As will be described in greater detail hereinafter, this video tape command is preferably stacked in conventional storage means 108 in a request que which is serviced by a control unit 110 to be described in greater detail hereinafter. This request que 108 preferably functions in a first-in-first-out mode so that when a particular request is serviced it becomes the top of the stack, the stack being known as a "push-pop" stack. This request is then identified as the next request, the next request being called from the request que 108 by the control unit portion 110 of the tape controller 44. The control unit 110 performs several different functions among them tape selection utilizing both audio and video multiplexers, frame selection, segment identification, tape speed control, the servicing of input/output requests, and, if desired, checking system performance utilizing input/output signals received via telephone lines from the branch banks. When a new request is received by the control unit 110, it is preferably conventionally separated into three parts comprising the tape number identification, the frame number identification and the segment number identification. Preferably, the control unit 110 contains a local memory so that it can service a plurality of requests for each tape simultaneously. The control unit 110 decides which request it wants to process at a particular time utilizing conventional control logic in accordance with predetermined conditional relationships to be described in greater detail hereinafter. Once control unit 110 has established that it will service a particular tape number it switches that tape's audio and video signals into the data retrieval network by a control command to the audio and video multiplexers 112 and 114, respectively, which are conventional. Preferably, the audio is serviced first since it provides control information to the system, the paticular number of each frame being preferably recorded in digital format on one audio track of the tape. A conventional audio demodulator 114 preferably converts this audio signal into digital commands for subsequent processing by the data petrieval network. The demodulator 114 output preferably provides the frame number to a conventional local memory unit 116 which is scanned by the control unit 110. As will be described in greater detail hereinafter, the control unit preferably utilizes the number to control the speed or velocity of each of the tape decks comprising the video tape file 42, speed control being accomplished by utilizing the fast-forward, rewind, and play speed controls of the conventional tape unit or deck, such as a conventional IVC series 700 black-and-white playback tape unit or a Sony video tape cassette unit. The control unit 110, as will be described in greater detail hereinafter, preferably acts as a digital servo to control the movement, both in velocity and direction, of all the tape units comprising the video tape file 42 so that an optimum search and retrieval of the pictorial information will be provided in order to provide the earliest scannable pictorial information display from a plurality of randomly selected pictorial information associated requests. The control unit 110 preferably samples each tape unit to identify its tape location with respect to the scanning heads of the tape, the control unit 110 preferably not waiting until the particular tape deck of the video tape file 42 has reached its desired frame but rather scanning all the tape decks in a cycle so that many requests may be handled simultaneously. Each tape deck in the video tape file 32 is preferably sampled for a predetermined short period of time sufficient to identify its position and its speed, each tape deck's speed being then controlled via speed control commands in the manner to be described in greater detail hereinafter so that as a particular tape unit nears the desired frame containing the requested pictorial information it is slowed down to conventional play speed so that it may be properly played and viewed in the pictorial retrieval system 20.

As was previously mentioned, the control unit 110 preferably separates a new request into a tape number identification, a frame number identification and a segment number identification through appropriate conventional sampling means 120, 122 and 124, respectively. The output of the frame number identification sampling means 122 is provided to a conventional frame selector network 126 which, when the frame number identification signal matches that of the frame selected, the frame number of the frames being scanned being provided to the frame selector 126 and to the control unit 110 via path 130 from multiplexer 112, the frame selector network 126 provides a control signal to a conventional frame enable gate 152. Frame enable gate 132 is preferably a conventional video gate which is digitially controlled to inhibit passing of video frames supplied thereto from video multiplexer 114 except when the desired frame is obtained as indicated by the provision of the control signal from the rame selector network 126 to the frame enable gate 132, this control signal being an enable signal. The signal provided from video multiplexer 114 to frame enable gate 132 is the composite video signal on the particular tape unit of the video tape file 42 which has been selected. The output of the frame enable gate 132 is preferably connected to a conventional detect-and-counting network 134 and, in parallel, to mask generator 48. The detect-and-counting network 134 conventionally detects the presence of the vertical sync and each horizontal sync pulse and counts the horizontal sync pulses. The counting of the horizontal sync pulses is utilized to provide identification of the particular segment of the frame which is being scanned or viewed at a given time, each of the frame segments comprising a predetermined portion of the 252 ½ horizontal scan lines conventionally comprising an entire video frame, the frame segment number identifying which scan lines in this total plurality of scan lines comprising the complete frame contain the appropriate frame segment containing the requested pictorial information. The output of this detection-and-counting network 134 is preferably provided to a conventional segment enable gate 136 whose other input is the output of the segment number identification sampler 124, the segment enable gate 136 comparing the segment number identification with the horizontal sync signal count output of the detection-and-counting network 134 to provide an output signal when these two signals are identical. This output signal is then provided to the mask generator 48 which, in the absence of this control output signal from the segment enable gate 136 blanks the entire frame provided thereto from the frame enable gate 132. When the control signal is provided, the mask generator 48 enables the viewing of that particular segment of the frame, the mask generator output 48 being a composite video signal which has blanked all those portions of the frame selected which are not desired. The mask generator 48 also preferably reformats the video picture in conventional fashion so that the signature contained in the segment selected is in the center of the screen with the balance of the signatures contained in that frame being blanked out. The composite video picture and the teller's identification number which has been supplied to the combiner from formatter 106 are then preferably combined in combiner 50 and are supplied to modulator 52 for subsequent transmission to the appropriate branch bank 58. If desired, the data retrieval system illustrated in FIG. 6 may also automatically monitor performance of the tape system by means of a fault detection circuit which views the video output of the video multiplexer 114 and establishes if the signal quality is sufficient. In such an instance, in the event that the fault detector deems the signal quality to be inadequate, a signal is sent to the control unit from a tape failure sensor 140 which makes this determination, informing the control unit 110 of this condition. If desired, provision of this signal to the control unit 110 from the tape failure sensor 140 may be utilized to activate an alarm signal 142 and/or to switch over to a conventional back-up tape unit (not shown). As shown and preferred in FIG. 6, if desired, the control unit 110 may also be utilized to monitor performance of the teller units in each branch through the various feedback paths 64 so that in the event of a malfunction, information is provided stating one particular piece of equipment has failed, this information being provided through conventional phone modems, two such modems 150 and 152 being shown by way of example, to a conventional input/output multiplexer 154 and therefrom to the control unit 110.

The central station portion of the pictorial information retrieval system 20 is readily interfaceable with a conventional general purpose digital computer, such as the IBM 370 model 145 previously mentioned. Data input in the computer 40 is preferably accomplished by providing a computer compatable tape with the account number and corresponding tape identifier, the programming required to store this information in the field corresponding to a particular account number being conventional and comprising the insertion of four bytes into the proper locations of the count records in the disc memory of the computer 40. Preferably, when an account is deleted in the pictorial retrieval system 20 of the present invention, this is readily accomplished by breaking a link from the account to its corresponding signature on the video tape, this link from the look-up table being replaced by a link to a standard frame such as one indicating that an account has been closed out or cancelled, this merely requiring a change of the four bytes for the particular record in question to substitute the tape location information contained in the four bytes for the location of the standard frame containing the closed out account information. Similarly, if a new account is opened and additional signatures are added to the tapes as well as account information to the computer memory, all that is required is that the four bytes associated with this storage location in the computer look-up table be changed from 0 to the corresponding video tape location. The output of the general purpose digital computer 40 is preferably provided to the tape controller 44 through a conventional computer compatable input/output multiplex device, the information being transferred to the tape controller 44 preferably comprising a teller's identification number, the bank branch identification both of these numbers comprising in the identifier word, and the video tape location signal. In transferring these signals, the usual conventional hand shaking signals are passed between controller 44 and the computer 40, the information is transferred and the controller 44 answers back to the computer 40 that it has received the message properly.

Summarizing the various communication links utilized in the pictorial retrieval system 20 of the present invention illustrated in FIG. 1, there are preferably five distinct communication links required for the system, these communication paths being from the central station to the distribution station 56, from the distribution station 56 to each of the teller stations 24 through 30, from each of the teller stations 24 through 30 back to the central station, such as via path 38, from each of the teller stations back to the distribution stations, and from each of the distribution stations back to the central station, such as via feedback path 64. The information transmitted from the central station of each distribution station 56, as previously mentioned, are video frames requested by each of the tellers as well as the identifier command signals necessary to operate the frame storage device 60 and the video monitor 32 at that particular teller station, a wide bandwidth communication link preferably being utilized to transmit the video frames. Both video and command signals, as previously mentioned, are preferably distributed from each distribution station 56 to each of the teller stations. The communication link between each teller and the central station, as previously mentioned, is utilized to initiate the request for the pictorial information from the computer 40 as well as the initiation of a transaction, preferably, if desired, associated with the account with which the signature is associated. The communication link between the teller and the distribution station is also preferably utilized to verify that the command signal sent to each teller's station was properly received. Lastly, the communication link between the distribution station and the central station is utilized to verify to the central computer 40 that all the command signals have in fact been received by the teller stations to whom they were intended. It should be noted that preferably, a conventional video frame storage device, such as a Hitachi frame grabber disc, may be utilized at the central station as an input/output intermediate buffer enabling low speed transmission of the video output signal over the voice grade telephone line and high speed recording of this signal to be transmitted at the central station.

Figure 8:
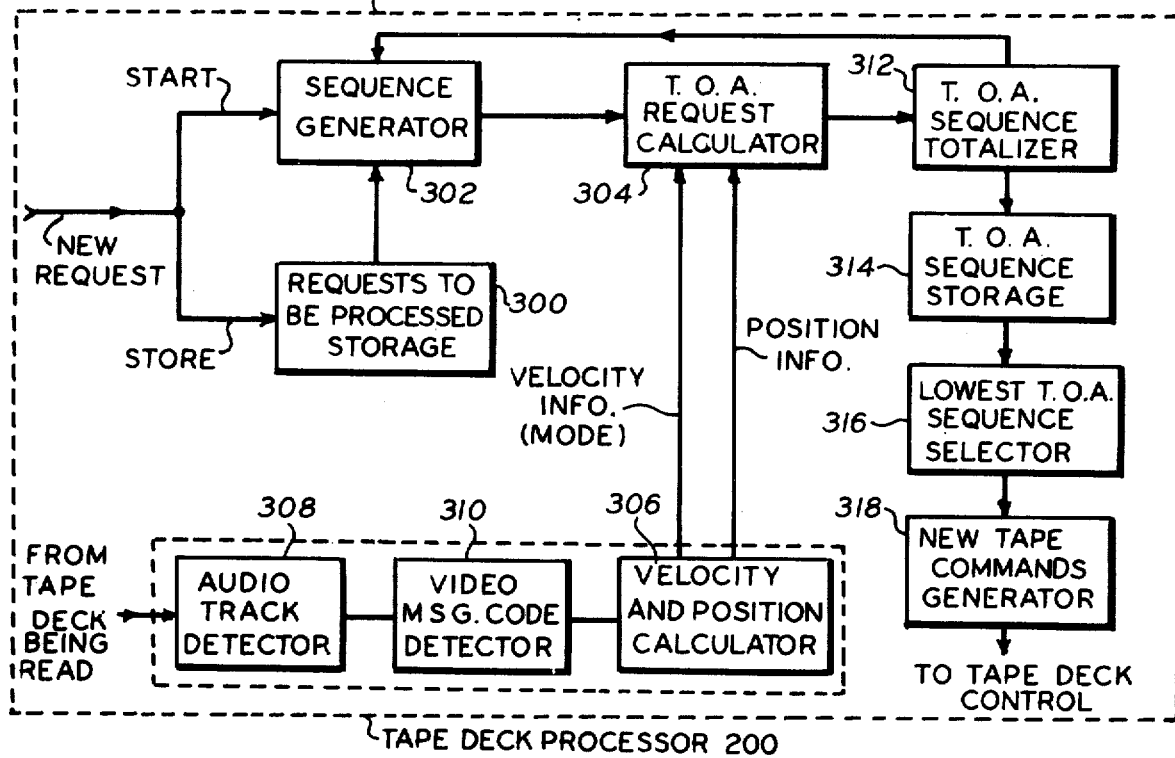
FIG. 8 is a block diagram of a typical controller of the type illustrated in block in FIG. 7.
Figure 9:
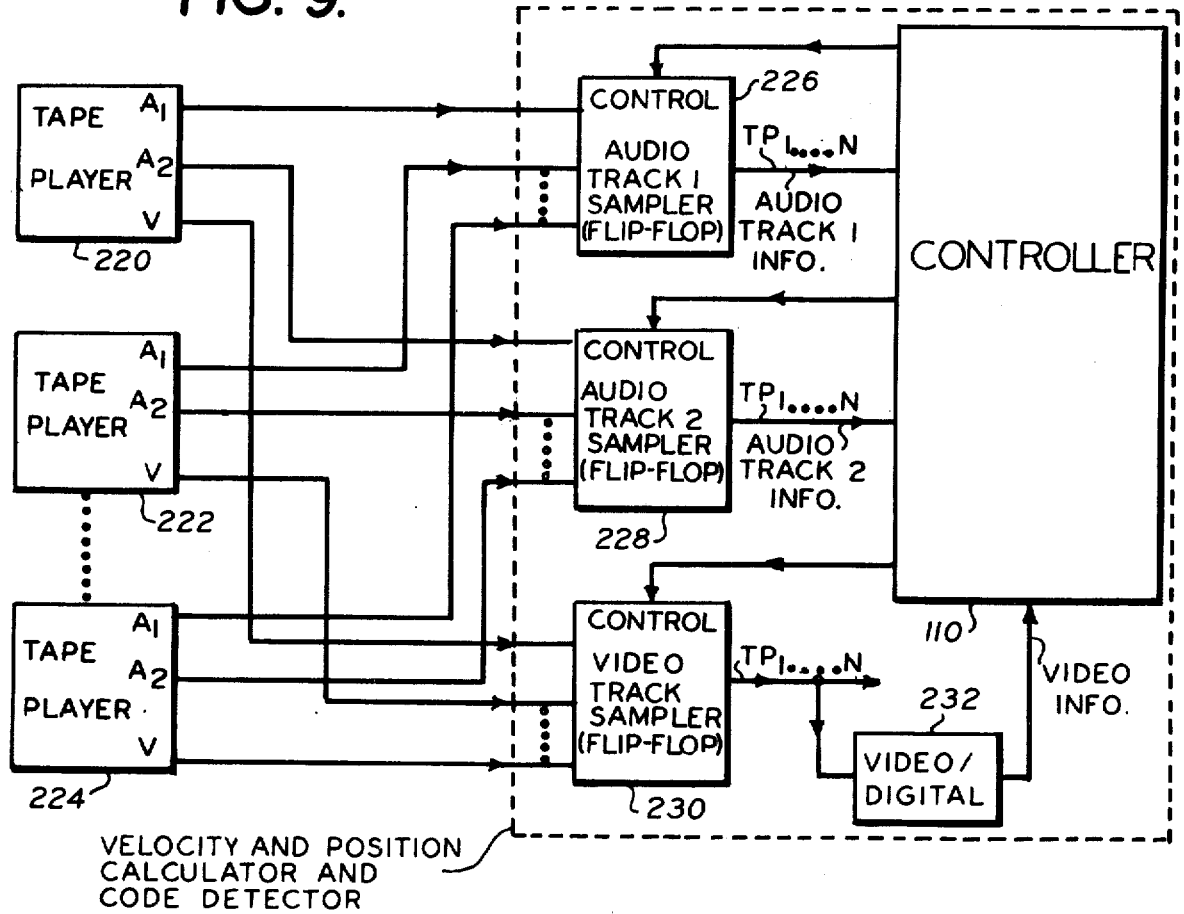
FIG. 9 is a block diagram of the general controller network of the system of FIG. 1.

Referring now to FIGS. 7 through 9, the control unit 110 of the video tape controller 44 shall be described in greater detail. The control unit 110 preferably includes a plurality to tape deck processing networks 200, 202, 204, etc., one such tape deck processing network being associated with each video tape deck, for determining the velocity and position information associated with the tape deck being read, as will be described with reference to FIG. 8. The input request which is the account number, as previously described, is provided through a buffer 102 and a request que 108 to the control unit 110, control unit 110 including a video information location determination circuit 206 which provides an output to a request tape deck processor selector 208 and subsequently provides a signal to the appropriate tape deck processing network 200, 202, 204 etc. of the control unit, as illustrated in FIG. 7. Referring now to FIG. 9, the scanning of the various tape decks of the video file 42 for providing the information from the audio tracks and the video track to the tape controller 44 and to the control unit 110 thereof is illustrated. The controller 44, including the control unit 110 preferably comprises a conventional minicomputer, such as an EPI 118 made by Electronics Processors Inc. or a PDP 11 made by Digital Equipment Corp., which is programmed in conventional fashion in accordance with the relationship to be described in greater detail hereinafter to determine the position and velocity of the various tapes being scanned, together with associated conventional logic circuitry.

Referring now to FIG. 9, the various tape decks comprised in the video file 42, three such conventional tape players 220, 222 and 224 being shown by way of example, are scanned by conventional video tape scanning heads for scanning both the video track and the audio track, as previously mentioned, and supplying these signals to conventional sampling networks 226, 228 and 230 one such sampling network being provided for each track of the tape. These sampling networks 226, 228 and 230 are preferably merely conventional flip-flops having a 0 and 1 state to indicate when the tape being sampled has passed or enters a frame and for gating the signals being scanned on the appropriate track to the control unit 110 for purposes of velocity and position calculation for the tapes and detection of the code contained in the audio tracks. As previously mentioned, one audio track, for example the $A_1$ track in FIG. 9, preferably contains one pulse per frame for enabling a rapid detection of each frame on the tape presently being scanned, such as in the fast-forward mode, by counting these pulses, the second audio track, indicated as $A_2$ in FIG. 9, preferably contains the unique digital code corresponding to the particular frame being scanned, and the video track indicated by V in FIG. 9 preferably contains one or more signatures or unique pieces of pictorial information per frame, and, preferably, a computer readable bar code associated with each signature which preferably corresponds, in the example given, to the account number, such as in both human and machine readable form. With respect to the audio track sampling network 226 for sampling the $A_1$ audio track containing one pulse per frame, this sampler 226 also preferably includes a conventional pulse counter which is initalized in conventional fashion by the signals contained on the $A_2$ track. As shown and preferred in FIG. 9., control signals for controlling samplers 226, 228 and 230 are provided by the control unit 110 which receives audio track digital information from sampling networks 226 and 228 and digital video information from sampling network 230 through a conventional video-to-digital converter 232.

Referring now to FIG. 8, system for controlling the optimization selection of the earliest scannable signature of pictorial information for video display from a plurality of signatures selected in a random sequence shall be described, this optimization preferably being achievable by conventional programming of the control unit 110 minicomputer, such as the EPI 118 programmed in conventional fashion in programming language or the PDP-11 minicomputer programmed in conventional fashion in the programming language. FIG. 8 illustrates the preferred optimization condition responsive network for a single tape deck processor 200, 202 or 204, by way of example, for selecting the earliest scannable pictorial information or signature in a given tape deck of the video tape file 42, this condition responsive optimization network, termed the tape deck processor, preferably being identical for each of the tape decks in the video tape file 42. For purposes of explanation, it is assumed that the pictorial retrieval system 20 is operating as a real time system in which new requests for pictorial information are provided at random intervals in real time, the condition responsive optimization network preferably optimizing the signature or pictorial information retrieval each time a new request is provided. It should be noted that when a request has been processed it is removed from those requests awaiting processing. For purposes of explanation it is assumed that a random sequence of requests for various different pictorial information or signatures contained on a given tape has been provided. These requests to be processed are stored in conventional fashion in a push-pop stack in conventional storage means 300 and a signal comprising the number of requests available in storage 300 is provided to a conventional sequence generator 302, such as a linked list which preferably generates an initial arbitrary sequence for the number of requests available and continues to update this sequence until the optimum sequence for selection of the earliest scannable pictorial information message in the plurality of randomly selected pictorial information message for that given tape is achieved. This arbitrary sequence output of sequence generator 302 is preferably provided to a condition responsive network for calculating the time of arrival, TOA, or access time for each request in the sequence based on velocity information and position information provided thereto, to be described in greater detail hereinafter. The velocity and position information are provided from a condition responsive network 306 which calculates of these representing different scanning speeds or velocity for the tape as well as, in the instance of rewind, a different direction, and position information which corresponds to the identification code location to be checked against the computer look-up table contained in main computer 40 to determine what position on the tape the scanning head is presently at. This velocity and position calculation in network 306 is provided from a conventional audio track detector 308 which is associated with the head scanning the given tape deck audio track containing the unique identification code for the frame, associated with a conventional video message code detector 310 which reads the identification code location of the video message or frame contained on the audio track. The condition responsive network 304 which calculates the access time for each request, or time of arrival, provides this information to another condition responsive network 312 for summing or totalizing the time of arrival, or access time for the arbitrary sequence, this condition responsive network 312 being connected in a feed-back loop with the sequence generator 302 for varying the sequence output of generator 302 in conventional fashion until the optimum selection sequence is obtained. The output of the condition responsive network 312 is provided to a conventional storage means 314 for storage of each sequence time of arrival or access time, this information being provided to a condition responsive network 316 for selecting the lowest time of arrival, or access time, sequence, which represents the optimum selection sequence. The control unit 110 then generates new tape commands, such as to preferably vary the mode or scanning speed of the tape, in accordance with this optimum selection sequence, these new tape commands being generated in conventional fashion from a conventional signal generator 318 to the given tape deck control mechanism. Preferably, for each sequence generated by sequence generator 302, the access time for each request is calculated and totalized to get the minimum overall access time, a new request being provided to the tape deck processing network 200 by way of example, initiating the generation of an initial arbitrary sequence from sequence generator 302 as well as the storage of this new request in storage means 300. It should be noted that the optimization of the selection of the earliest scannable pictorial information message for the latest request does not occur until the previous one is finished, the optimization preferably going sequentially in order of request to the computer 40. The proper tape deck for the earliest scannable pictorial information message is first selected and then the requests pertaining to that deck are sorted, the optimization being time shared on a deck-by-deck basis and, preferably, the optimization for the deck containing the latest request not occuring until the previous one is finished. It should be noted that the processing of the old sequence is uninterrupted until a new lowest time of arrival or access time, or optimum, sequence is determined based on a new request.

Referring to FIGS. 8 and 9, the conventional programming of the minicomputer associated with the control unit 110 is preferably in accordance with the following relationships in order to determine the position and velocity calculations associated with the various tapes in the video tape file 42. Information from audio track one in the sample given, the $A_1$ track, is utilized to find the location on each tape, designated TP using the following counting algorithm; Loc $(TP_{x_{t-1}}) \pm$ Count$_t$, where Loc = Location, the plus or minus sign in this algorithm being dependent on the direction of tape movement during scanning, and, as previously mentioned, the tape for purposes of reading the information on audio track one in the example given is for high speed scanning in the fast forward mode in which the plus sign is utilized in the algorithm while high speed scanning in the opposite direction in the rewind mode would require the use of the minus sign in the algorithm. The speed or velocity of the given tape, TP$x$ in the example being given is in accordance with the following algorithm:

$$S(TPx) = \frac{[\text{Loc}(TPx_t) - \text{Loc}(TPx_{t-a})]}{T_t - T_{t-a}}$$

Where $S$ = Speed, $Loc$ = Location
This counting algorithm previously described is utilized to control a conventional incrementing digital counter whose signal is provided to a conventional comparator or digital divider.

The information from the second audio track, $A_2$, which is provided from audio sampler 228, the first audio track information being provided from audio sampler 226 to the control unit 110, utilizes the following algorithm for the tape in the play mode, preferably, in order to provide a check on the count achieved in accordance with the algorithm utilized for the first audio track information in the high speed scan mode described above, the audio sampling of the second track being of all decks in the play mode;

$$Loc\ TP_x = Audio\ 2_x$$

Where $Loc$=Location, $Audio\ 2 = A_2$
This information is also provided to the comparator which, when the location determined in accordance with the counting algorithm for audio track 1 is identical with the location determined in accordance with the counting algorithm for audio track 2, provides an output signal indicating this condition; in the absence of this condition, an error signal is provided. As was previously mentioned, the information on the second audio track, $A_2$, is utilized to initalize the incrementing digital counter associated with the audio track location indicates by the unique code scanned on audio track 2 is preferably loaded into a conventional storage register when the location is correct, as indicated by the previously described check, in accordance with the following algorithm which is utilized in the play mode to verify the account number being loaded into the storage register.

$$Acct\ No_x = Video\ In\ CTP_x$$

This account number being provided from the output of the video-to-digital converter 232 provided to the control unit 110. This video input signal, which is the storage register account number, is provided to a conventional comparator whose other input is the account number desired or corresponding to the request. If these correspond, then the comparator will provide a signal indicating this condition; however, if the two do not correspond then the comparator will generate an error signal and the request will remain in the tape request stack. This account verification algorithm for the control unit 110 is preferably utilized for a single video output frame.

Referring now to the storage of the request to be processed in the push-pop stack 300, stack 300 is, as previously mentioned, a conventional storage device, such as an LSI memory, in which insertion of a new request is accomplished through conventional registers and buffers in a move command data processing sequence. The preferred condition responsive operation of the push-pop stack storage 300 which stores the position of the tape TP$x$, the speed or velocity of the tape TP$x$ and the status of the tape TP$x$ for each of the requests in the request stack, is as follows, the condition responsive storage algorithm for insertion of the request in the request stack being as follows:

1. If position of TP$x$, current request less than next request in stack, then put current request on top of stack;
2. If position of TP$x$ greater than last request, then place on bottom of stack;
3. Otherwise insert request in stack position such that A request less than current request and B request greater than current request.

The request is preferably removed from the top of the request stack 300 when the position of the tape TP$x$ is equivalent to the next request and, subsequently, the frame output is provided to the user in the manner a previously described and the stack is pushed up one request. The condition responsive network associated with the control unit 110 tape drive command generation is preferably in accordance with the following conditions:

1. TP$x$ Should Be In The Fast Forward Move For Position TP$x$ Next Request — A
2. TP$x$ Should Be In Play Mode For Position TP$x$ less than Next Request — A;
3. TP$_x$ Should Be In Rewind Mode When Tape Reaches End.

For example, assuming the various positions of the tape frames are indicated by the numerals 1 through 10, and TP$x$ = 4, A the slow down constant equals 3 and N which is the next request = 8, the tape command signal provided from control unit 110 via network 318 should preferably place the corresponding tape deck in the fast-forward mode, this condition complying with the condition associated with the fast-forward mode. Similarly, if TP$_x$ equals 6, the other conditions A=3, and the next request equalling 8 remain the same, then the tape command signal provided from the control unit 110 should place the appropriate tape deck in the play mode, these conditions complying with the appropriate conditions for the play mode. Preferably, for plural users, that is the preferred case where a plurality of tape decks are provided in the video file 42, the slow down constant A is a variable for each tape player depending on what the position of the tape player is for the next request and for all of the remaining decks so that the outputs of the various tape decks are staggered and, accordingly, the switch-over, or change in modes, for example from fast-forward to play, should preferably not have the same slow down constant A for any tape players in the same time period. Accordingly, the computer 40 is preferably programmed in conventional fashion to dynamically assign the slow down constant A to the condition responsive network of the control unit 110 based on the minimum slow down constant A for a given tape deck. As was previously mentioned, all of the above algorithms or conditional relationships are achieved in conventional fashion by conventional condition responsive logic networks, such as provided from conventionally programming a conventional minicomputer, such as the PDP 11 or the EPI 118.

Referring now to FIGS. 10 and 11, a secure transmission system which may be utilized in the pictorial information retrieval system 20 of the present invention is shown. As was previously mentioned, the conventional frame grabbing disc may be utilized as an intermediate transmission buffer for the pictorial information being provided from the control station portion of the pictorial information retrieval system. In such an instance, the control portion, represented by the illustration labeled transmitter in FIG. 10, receives the unscrambled video signal on a single conventional write head 400 for writing this signal on the conventional frame grabbing video disc 402. This information is preferably read out off this video disc 402 by means of a plurality of conventional read heads, two such read heads 404 and 406 being shown by way of example although this concept is equally applicable to any number of read heads greater than one. The read heads 404 and 406 provide a scrambled output signal composed of the input video signal provided from the control portion of the retrieval system 20 in the following manner. Conventional video gates 408 and 410 are respectively associated with the read heads 404 and 406, respectively, the output of these video gates 408 and 410 being combined to provide the scrambled video output signal, or secure transmission. These video gates 408 and 410 received as inputs thereto respective outputs of read heads 404 and 406 and are enabled by means of control signals which are provided from a conventional programmable switching matrix 412 such as, in the instance of only two read heads, a flip-flop whose state is changed in accordance with a programmed scramble function, such as provided from a read only memory, so as to open the video gates 408 and 410 at selected times, each gate preferably being mutually exclusive, to read any number of scan lines or fractions thereof from the video disc 402 ans switch back and forth between these gates 408 and 410 in accordance with the programmed scrambled function to provide a scrambled video output signal.

Referring now to FIG. 11, the unscrambling of the video signal at the receiver end, which may preferably be accomplished either at the distribution unit 56 or at the individual teller display unit 24 through 30, is accomplished in the following manner. A frame grabbing disc, as previously mentioned, is also preferably provided and associated with each teller display, this conventional frame grabbing video disc 414, such as one forming part of the frame storage device 60, preferably having a number of conventional write heads equivalent to the number of read heads associated with the video disc 402 which is transmitting the scrambled video output signal. In the example given this comprises two write heads 416 and 418. The video disc 414 also preferably has a single conventional read head 420 for providing the unscrambled video output signal to the display device or, if utilized at the distribution unit, this signal is provided to the individual video frame storage devices 60 associated with the individual teller video monitors 32. Each of the write heads 416 and 418 preferably have an associated video gate 422 and 424 which are conventional and which receive the scrambled video output signal provided from the transmitter as an input thereto. A programmable switching matrix 428 is preferably programmed with the unscrambled function corresponding to the scramble function provided by switching matrix 412 of the scrambled video output signal of the transmitter. Thus, the programmable switching matrix 428 provides control signals to open video gates 422 and 424 respectively at selected times, each of these gates 422 and 424 being mutually exclusive, to unscramble the scrambled video input in the same sequence and manner as previously described with reference to the scrambling of the video signal. The programming control for the switching matrix 428, if desired, could be transmitted dynamic electronic digital code rather than a stored program so as to enable changing of the unscrambled code on a field-by-field basis.

By utilizing the pictorial retrieval system of the present invention, pictorial information may be rapidly retrieved for video display, such as for purposes of signature verification for bank accounts or credit verification or for any one of a plurality of different purposes that would readily occur to one of ordinary skill in the art, such retrieval, if desired, being accomplished with the simultaneous processing of data associated with the pictorial information being retrieved.

It is to be understood that the above described embodiments of the invention are merely illustrative of the principles thereof and that numerous modifications and embodiments of the invention may be derived within the spirit and scope thereof,

What is claimed is:

1. A system for retrievably providing a video display of an information message on a video display means, said system comprising:

a video tape storage media having a plurality of said video displayable messages storable thereon, said video tape storage media having a first audio track having identification information stored therein and a video track having video information stored therein, said video information comprising a plurality of video displayable frames, each of said frames being capable of providing a video signal containing the video displayable information within said frame and comprising a plurality of frame segments, each of said frame segments containing one of said video displayable messages and being capable of providing a portion of said frame video signal containing said one message, said first audio track identification information comprising a plurality of different unique frame identification codes, each frame code being uniquely associated with one frame of said plurality of frames, each of said frame video signals further comprising a plurality of horizontal sync pulses for the video display of said frame video signal, each of said sync pulses being associated with a displayable video scan line, each of said frame segment video signal portions of said frame video signal comprising a predetermined portion of the plurality of displayable video scan lines associated with said frame video display having a corresponding predetermined portion of said plurality of horizontal sync pulses;

means for selecting a unique video displayable message for video display thereof, said selection means providing a unique selection control signal uniquely corresponding to said selected message;

means for scanning said storage media in response to said selection control signal for initiating selection of said unique video displayable message, said scanning means comprising means for subsequently providing said video display from said storage media and means responsive to said first audio track frame identification information for providing a frame location signal;

first condition responsive means operatively connected to said scanning means for retrieving the frame containing said selected message in response to detection of the frame location signal associated with said frame containing said selected message and for counting the horizontal sync pulses in said retrieved frame for providing a display control signal for retrieving said frame segment containing said selected message in response to detection of the count associated with said selected message containing segment; and mask generator means operatively connected to said first condition responsive means for providing a composite video displayable output signal to said video display means, said mask generator means providing said single frame segment containing said selected message as said output signal in response to receipt of said display control signal and blanking said entire frame in the absence of receipt of said display control signal; whereby the audio track of a video tape storage media enables a single frame segment to be selectively retrieved from a plurality of frames of video information stored in the video track of said video tape storage media for video display of said frame segment.

2. A system in accordance with claim 1 wherein said video displayable message comprises a unique signature and said unique frame identification code comprises a unique account number associated with said signature, said signature providing identification authorization to make transactions with respect to said associated account number, said video display of said associated signature being provided in response to said selection of said unique account number for enabling verification of an externally provided signature for said associated account number.

3. A system in accordance with claim 2 wherein said selection means comprises information input means and data processing means operatively connected thereto, said information input means providing said selected account number and selected transaction information associated with said selected account number to said data processing means, said data processing means comprising means for retrievably storing information uniquely associated with said account numbers and second conditon responsive means for providing said unique selection control signal in response to said provided selected account number information input, said data processing means second condition responsive means processing an associated selected transaction associated with said account number in response to said provided selected account number and associated selected transaction information substantially simultaneously with said retrieval and video display of said associated signature.

4. A system in accordance with claim 1 further comprising a plurality of video tape storage media, each of said plurality of storage media having a plurality of said video displayable messages storable thereon, each of said video tape storage media having a first audio track having identification information thereon and a video track having video information thereon, said video information comprising a plurality of video displayable frames, each of said frames being capable of providing a video signal containing the video displayable information within said frame and comprising a plurality of frame segments, each of said frame segments containing one of said video displayable messages and being capable of providing a portion of said frame video signal containing said one message, said first audio track identification information comprising a plurality of different unique frame identification codes, each frame code being uniquely associated with one frame of said plurality of frames, each of said frame video signals further comprising a plurality of horizontal sync pulses for the video display of said frame video signal, each of said sync pulses being associated with a displayable video scan line, each of said frame segment video signal portions of said frame video signal comprising a predetermined portion of the plurality of displayable video scan lines associated with said frame video display having a corresponding predetermined portion of said plurality of horizontal sync pulses; said scanning means scanning each of said storage media, each of said scanned storage media having an associated position and velocity with respect to said scanning means, said message selection means comprising means for selecting a plurality of unique video displayable messages in a random sequence, said selection means comprising second condition responsive means for sensing the position and velocity of each of said video tape storage media being scanned and for providing a unique optimum selection control signal uniquely corresponding to said selected message in accordance with the earliest scannable selected message in said random sequence, said scanning means providing said video display of said earliest scannable selected message to said first condition responsive means in response to said unique optimum selection control signal, said first condition responsive means retrieving the frame containing said earliest selected message in response to detection of the frame location signal associated with said earliest scannable selected message containing frame.

5. A system in accordance with claim 4 wherein said video displayable message comprises a unique signature and said unique frame identification code comprises a unique account number associated with said signature, said signature providing identification of authorization to make transactions with respect to said associated account number, said video display of said associated signature being provided in response to said selection of said unique account number for enabling verification of an externally provided signature for said associated account number.

6. A system in accordance with claim 5 wherein said selection means further comprises information input means and data processing means operatively connected thereto, said information input means providing said selected account number and selected transaction information associated with said selected account number to said data processing means, said data processing means comprising means for retrievably storing information uniquely associated with said account numbers and said second condition responsive means for providing said unique optimum selection control signal in response to said provided selected account number information input, said data processing means second condition responsive means processing an associated selected transaction associated with said account number in response to said provided selected account number and associated selected transaction information substantially simultaneously with said retrieval and video display of said associated signature.

7. A system in accordance with claim 4 further comprising means operatively connected to said mask generator means output for scrambling said earliest scannable selected video output signal for providing a secure transmittable video output signal for said earliest scannable selected message.

8. A system in accordance with claim 4 further comprising frame storage means operatively connected to said mask generator means output for grabbing said video frame segment earliest scannable selected video output signal for providing a continuous repetitive video output transmission thereof, said frame grabbing means having an associated information recording rate for storage of said video output signal and an associated information playback rate for transmission of said video output signal, whereby said frame grabbing means provides an intermediate transmission buffer storage for said earliest scannable selected video output signal transmission.

9. A system in accordance with claim 8 wherein said recording rate and said playback rate are different.

10. A system in accordance with claim 8 further comprising means operatively connected to said frame grabbing means video output transmission for scrambling said earliest scannable selected video output signal transmission for providing a secure transmittable video output signal for said earliest scannable selected message.

11. A system in accordance with claim 10 wherin said frame grabbing means comprises a recording means for storing said video output signal and a plurality of playback means for transmission of said video output signal; and said secure transmission means comprises mutually exclusive gating means associated with each of said playback means, means for selectively enabling one of said gating means at a time for transmitting a portion of said video output signal through said gating means and combining means for combining said selected portions into said scrambled video output signal secure transmission.

12. A system in accordance with claim 4 wherein each of said storage media further comprises a second audio track containing a common pulse code information thereon, one pulse being provided per video frame for enabling high speed scanning of said storage media for locating the frame containing said earliest scannable selected message, said scanning means further comprising counting means for counting said pulses during said high speed scanning for providing said frame location signal.

13. A system in accordance with claim 12 wherein said first audio track unique frame identification code comprises a digital code, said first scanning means being responsive to said digital code at a lower speed of scan for said storage media for providing said frame location signal therefrom than for scanning said pulse code information.

14. A system in accordance with claim 13 wherein said second condition responsive means further comprises means for varying the speed of scanning of each of said plurality of storage media in accordance with said unique optimum selection control signal dependent on the position and velocity of said frames containing said selected messages with respect to said scanning means, whereby said earliest scannable selected message is provided.

15. A system in accordance with claim 14 wherein said scanning speed varying means comprises means for varying said direction and said speed of scanning of each of said plurality of storage media in accordance with said unique optimum selection control signal dependent on the position and velocity of said frames containing said selected message with respect to said scanning means, whereby said earliest scannable selected message is provided.

16. A system in accordance with claim 4 wherein said second condition responsive means further comprises means for varying the speed of scanning of each of said plurality of storage media in accordance with said unique optimum selection control signal dependent on the position and velocity of said frames containing said selected messages with respect to said scanning means, whereby said earliest scannable selected message is provided.

17. A system in accordance with claim 16 wherein said scanning speed varying means comprises means for varying said direction and said speed of scanning each of said plurality of storage media in accordance with said unique optimum selection control signal dependent on the position and velocity of said frames containing said selected message with respect to said scanning means, whereby said earliest scannable selected message is provided.

18. A system in accordance with claim 1 further comprising means operatively connected to said mask generator means output for scrambling said selected video output signal for providing a secure transmittable video output signal for said selected message.

19. A system in accordance with claim 1 for grabbing said video frame segment selected video output signal for providing a continuous repetitive video output transmission thereof, said frame grabbing means having an associated information recording rate for storage of said video output signal and an associated information playback rate for transmission of said video output signal, whereby said frame grabbing means provides an intermediate transmission buffer storage for said selected video output signal transmission.

20. A system in accordance with claim 19 wherein said recording rate and said playback rate are different.

21. A system in accordance with claim 19 further comprising means operatively connected to said frame grabbing means video output transmission for scrambling said selected video output signal transmission for providing a secure transmittable video output signal for said selected message.

22. A system in accordance with claim 21 wherein said frame grabbing means comprises a recording means for storing said video output signal and a plurality of playback means for transmission of said video output signal; and said secure transmission means comprises mutually exclusive gating means associated with each of said playback means, means for selectively enabling one of said gating means at a time for transmitting a portion of said video output signal through said gating means and combining means for combining said selected portions into said scrambled video output signal secure transmission.

23. A system in accordance with claim 1 wherein said storage media further comprises a second audio track containing a common pulse code information thereon, one pulse being provided per video frame for enabling high speed scanning of said storage media for locating the frame containing said earliest scannable selected message, said scanning means further comprising counting means for counting said pulses during said high speed scanning for providing said frame location signal.

24. A system in accordance with claim 23 wherein said first audio track unique frame identification code comprises a digital code, said first scanning means being responsive to said digital code at a lower speed of scan for said storage media for providing said frame location signal therefrom than for scanning said pulse code information.

25. A system for retrievably providing a video display of an information message on a video display means, said system comprising:

a plurality of video tape storage media, each of said plurality of storage media having a plurality of said video displayable messages storable thereon, each of said video tape storage media having a first audio track having identification information stored therein and a video track having video information stored therein, said video information comprising a plurality of video displayable frames, each of said frames being capable of providing a video signal containing the video displayable information within said frame, each of said frames containing at least one of said video displayable messages, said first audio track identification information comprising a plurality of different unique frame identification codes, each frame code being uniquely associated with one frame of said plurality of frames;

means for selecting a unique video displayable message for video display thereof, said selection means providing a unique selection control signal uniquely corresponding to said selected message for initiating selection of said unique video displayable message;

means for scanning said storage media in response to said selection control signal, said scanning means comprising means for subsequently providing said video display from said storage media and means responsive to said first audio track frame identification information for providing a frame location signal;

first condition responsive means operatively connected to said scanning means for retrieving the frame containing said selected message in response to detection of the first audio track frame identification information provided frame location signal associated with said selected message containing frame, said scanning means scanning each of said storage media, each of said scanned storage media having an associated position and velocity with respect to said scanning means, said message selection means comprising means for selecting a plurality of unique video displayable messages in a random sequence, said selection means comprising second condition responsive means for sensing the position and velocity of each of said video tape storage media being scanned and for providing a unique optimum selection control signal uniquely corresponding to said selected message in accordance with the earliest scannable selected message in said random sequence, said scanning means providing said video display of said earliest scannable selected message to said first conditon responsive means in response to said unique optimum selection control signal, said first condition responsive means retrieving the frame containing said earliest scannable selected message in response to detection of the frame location signal associated with said earliest scannable selected message containing frame; and means operatively connected to said first condition responsive means for providing a composite video displayable output signal of said earliest scannable selected message to said video display means, whereby the audio tracks of said video tape storage media enable the frame containing the earliest scannable video displayable selected message of video information stored in said video tracks of said video tape storage media to be retrieved from said plurality of video tape storage media containing said video displayable selected messages for providing a pseudo random access system from said sequential access video tape storage media.

26. A system in accordance with claim 25 wherein said video displayable message comprises a unique signature and said unique frame identification code comprises a unique account number associated with said signature, said signature providing identification of authorization to make transactions with respect to said associated account number, said video display of said associated signature being provided in response to said selection of said unique account number for enabling verification of an externally provided signature for said associated account number.

27. A system in accordance with claim 26 wherein said selection means further comprises information input means and data processing means operatively connected thereto, said information input means providing said selected account number and selected transaction information associated with said selected account number to said data processing means, said data processing means comprising means for retrievably storing information uniquely associated with said account numbers and said second condition unique optimum selected control signal in response to said provided selected account number information input, said data processing means second condition responsive means processing an associated selected transaction associated with said account number in response to said provided selected account number and associated selected transaction information substantially simultaneously with said retrieval and video display of said associated signature.

28. A system in accordance with claim 25 further comprising means operatively connected to said composite video signal providing means output for scrambling said selected video output signal for providing a secure transmittable video output signal for said earliest scannable selected message.

29. A system in accordance with claim 25 further comprising frame storage means operatively connected to said composite video signal providing means output for grabbing said video frame segment selected video output signal for providing a continuous repetitive video output transmission thereof, said frame grabbing means having an associated information recording rate for storage of said video output signal and an associated information playback rate for transmission of said video output signal, whereby said frame grabbing means provided an intermediate transmission buffer storage for said selected video output signal transmission.

30. A system in accordance with claim 29 wherein said recording rate and said playback rate are different.

31. A system in accordance with claim 29 further comprising means operatively connected to said frame grabbing means video output transmission for scrambling said selected video output signal transmission for providing a secure transmittable video output signal for said selected message.

32. A system in accordance with claim 31 wherein said frame grabbing means comprises a recording means for storing said video output signal and a plurality of playback means for transmission of said video output signal; and said secure transmission means comprises mutually exclusive gating means associated with each of said playback means, means for selectively enabling one of said gating means at a time for transmitting a portion of said video output signal through said gating means and combining means for combining said selected portions into said scrambled video output signal secure transmission.

33. A system in accordance with claim 29 wherein each of said storage media further comprises a second audio track containing a common pulse code information thereon, one pulse being provided per video frame for enabling high speed scanning of said storage media for locating the frame containing said earliest scannable selected message, said scanning means further comprising counting means for counting said pulses during said high speed scanning for providing said frame location signal.

34. A system in accordance with claim 33 wherein said first audio track unique frame identification code comprises a digital code, said first scanning means being responsive to said digital code at a lower speed of scan for said storage media for providing said frame location signal therefrom than for scanning said pulse code information.

35. A system in accordance with claim 34 wherein said scanning speed varying means comprises means for varying said direction and said speed of scanning each of said plurality of storage media in accordance with said unique optimum selection control signal dependent on the position and velocity of said frames containing said selected message with respect to said scanning means, whereby said earliest scannable selected message is provided.

* * * * *